Patented May 17, 1932

1,859,002

UNITED STATES PATENT OFFICE

ADAM OSER AND ADRIEN LAURENT, OF LYON, FRANCE, ASSIGNORS TO SOCIETE DES USINES CHIMIQUES RHONE-POULENC, OF PARIS, FRANCE, A CORPORATION OF FRANCE

PROCESS FOR THE MANUFACTURE OF 1-PHENYL-2,3-DIMETHYL-5-PYRAZOLONE

No Drawing. Application filed June 17, 1931, Serial No. 545,072, and in Great Britain November 19, 1930.

1-phenyl-2, 3-dimethylpyrazolone, or antipyrine, is prepared technically by the Knorr process (Berichte 17, page 549) by treating the 1-phenyl-3-methylpyrazolone with an excess of methyl halide in a closed vessel at a temperature of from 90° to 120° C. (Ullmann, Enzyklopädie der technischen Chemie, 2nd edition—1928, p. 550). This process, which has all the technical drawbacks involved by the use of an apparatus which is subjected to a pressure of from 10 to 15 kilogrammes per centimetre square, is also very imperfect from the chemical point of view. On the one hand, the excess of alkylating agent is partly transformed into methyl oxide, and, on the other hand, quaternary ammonium halides are formed by fixation of methyl halide on the methylated base; finally, the methylation produces oily by-products of uncertain constitution, but which differ from antipyrine, in quantities which are not negligible.

It has also been proposed to manufacture antipyrine by using as methylating agent either dimethyl sulphate (Grandmougin, Chemiker Zeitung 1913 p. 812) or methyl paratoluenesulphonate (Rodionow, Bull. Soc. Chim. 4, XXXIX—p. 321), but the yields obtained barely reach 80% and 47%, respectively, of the theoretical yields.

We have discovered that antipyrine is obtained under conditions which are technically very satisfactory, and with approximately quantitative yields, by causing gaseous methyl halides to react on 1-phenyl-3-methylpyrazolone. By this process one obviates the use of strong autoclaves having to resist the pressure of the vapours given out by the methylating agent at the methylation temperatures employed in the known methylation methods. It is sufficient to maintain the gaseous methyl halide in contact with the phenylmethylpyrazolone, ensuring, if desired, a continuous renewal of the contacting surfaces by suitable stirring devices, in order that the methylation shall take place. As the reaction takes place quite well at atmospheric pressure, the operation can be carried out in apparatus which are simple in construction and with large quantities of materials. It is however well understood that, according to the invention, the methylating agent can be used under a pressure slightly above atmospheric pressure, which may be advantageous for facilitating the condensation of the possible excess of methyl halide having passed through the methylation apparatus without taking part in the reaction; this slightly increased pressure is, in any case very much below the pressure used in the process of methylation in autoclave used hitherto.

The present invention gives also excellent results from a chemical point of view, for it has been ascertained that, when operating with the new process, on the one hand the methyl halide is used quantitatively for the methylation without formation of methyl oxide, and on the other hand the formation of quaternary ammonium halides, or other secondary products formed during the methylation under pressure, is either completely avoided or reduced to negligible proportions; the crude antipyrine obtained by the present process, freed by treatment with caustic soda from the small quantities of phenylmethylpyrazolone which may have avoided the reaction, is therefore much more pure than that obtained by the old processes of methylation in closed vessels. In this way, it is possible to arrive at yields of pure antipyrine exceeding 94% of the theoretical yield with respect to the phenyl-methylpyrazolone used.

In carrying out the invention it is advantageous in practice to perform the reaction in the presence of diluents having a high boiling point, which increases the fluidity of the reacting mass; the use of tertiary organic bases which are not capable of reacting on the halides employed and, particularly, of antipyrine itself, as diluent, is particularly interesting, as the presence of an excess of these bases appears to enhance the fixation of the halogen hydride acid formed, and renders the methylation more rapid.

Examples illustrating the manner in which the invention is carried out are given hereafter. It is understood that the invention is by no means restricted to these examples. The parts are by weight.

*Example 1.*—A mixture of 250 parts of 1-phenyl-3-methyl-pyrazolone with 250 parts of anisol is introduced into a column filled with Raschig rings. The temperature is raised to 135° C. and a stream of gaseous methyl bromide is caused to bubble through the melted mass. The operation is continued for 10 hours. The reacting mass is then freed from anisol by steam distillation, and is treated with an aqueous caustic soda solution which dissolves the unchanged phenyl-methyl-pyrazolone, while the antipyrine remains undissolved. In this manner 257 parts of crude antipyrine are obtained, melting at 105–107° C. and 4 parts of phenyl-methylpyrazolone are recovered.

*Example 2.*—250 parts of 1-phenyl-3-methylpyrazolone and 250 parts of antipyrine are introduced into an apparatus provided with a helicoidal stirrer, and the temperature is raised to 125–130° C. A stream of gaseous methyl chloride is caused to bubble through the melted mass. The excess of methyl chloride which is not absorbed escapes and is recovered by known methods. The operation is brought to an end after 48 hours and, at this moment, 90% of the phenyl-methylpyrazolone is transformed into antipyrine. The non-methylated phenyl-methyl-pyrazolone is recovered by treating the product of the reaction with an aqueous caustic soda solution. No appreciable formation of secondary products is observed; the recovered methyl chloride is free from methyl oxide. The yield in pure antipyrine with respect to the phenyl-methylpyrazolone exceeds 94% of the theoretical yield, taking in consideration the phenyl-methyl-pyrazolone recovered.

What we claim and desire to secure by Letters Patent is:—

1. A process for the manufacture of 1-phenyl-2,3-dimethyl-5-pyrazolone by causing gaseous methyl halides to react on 1-phenyl-3-methyl-pyrazolone.

2. A process for the manufacture of 1-phenyl-2,3-dimethyl-5-pyrazolone by causing gaseous methyl halides to react on 1-phenyl-3-methyl-pyrazolone at a pressure near atmospheric pressure.

3. A process for the manufacture of 1-phenyl-2,3-dimethyl-5-pyrazolone by causing gaseous methyl halides to react on 1-phenyl-3-methyl-pyrazolone in the presence of an inert diluent having a high boiling point.

4. A process for the manufacture of 1-phenyl-2,3-dimethyl-5-pyrazolone as claimed in claim 3, the diluent being a tertiary organic base which is not capable of reacting on the halides employed.

5. A process for the manufacture of 1-phenyl-2,3-dimethyl-5-pyrazolone as claimed in claim 3, the diluent being antipyrine.

6. A process for the manufacture of 1-phenyl-2,3-dimethyl-5-pyrazolone as claimed in claim 3, and treating the mass resulting from the reaction with an aqueous caustic soda solution to recover the non-methylated phenyl-methyl-pyrazolone.

7. A process for the manufacture of 1-phenyl-2,3-dimethyl-5-pyrazolone by causing gaseous methyl chloride to react on 1-phenyl-3-methyl-pyrazolone in the presence of antipyrine, and treating the product of the reaction with an aqueous caustic soda solution after having distilled the non-absorbed methyl chloride.

8. A process for the manufacture of 1-phenyl-2,3-dimethyl-5-pyrazolone by causing gaseous methyl chloride to react on 1-phenyl-3-methyl-pyrazolone in the presence of antipyrine at a temperature of 125–130° C., treating the product of the reaction with an aqueous caustic soda solution after having distilled the non-absorbed methyl chloride.

In testimony whereof we have signed our names to this specification.

ADAM OSER.
ADRIEN LAURENT.